US007097267B2

(12) United States Patent
Kato et al.

(10) Patent No.: US 7,097,267 B2
(45) Date of Patent: Aug. 29, 2006

(54) INK-JET PRINTING METHOD, PRINTING SYSTEM, INK-JET PRINTING APPARATUS, PRINT DATA GENERATING METHOD, PROGRAM AND PRINTER DRIVER

(75) Inventors: Minako Kato, Kanagawa (JP); Rie Kajihara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 94 days.

(21) Appl. No.: 10/653,207

(22) Filed: Sep. 3, 2003

(65) Prior Publication Data

US 2004/0046817 A1 Mar. 11, 2004

(30) Foreign Application Priority Data

Sep. 9, 2002 (JP) ............................ 2002-263222

(51) Int. Cl.
*B41J 2/205* (2006.01)
*G06F 15/00* (2006.01)

(52) U.S. Cl. .......................................... 347/15; 347/43

(58) Field of Classification Search .................. 347/16, 347/15, 43, 14; 358/1.2, 1.9
See application file for complete search history.

(56) References Cited

U.S. PATENT DOCUMENTS

| | | | | |
|---|---|---|---|---|
| 5,198,833 | A | 3/1993 | Kubota | |
| 5,739,828 | A | 4/1998 | Moriyama et al. | |
| 5,745,131 | A | 4/1998 | Kneezel et al. | |
| 6,089,697 | A | 7/2000 | Tajika et al. | |
| 6,283,571 | B1 | 9/2001 | Zhou et al. | |
| 6,325,492 | B1 | 12/2001 | Koitabashi et al. | |
| 6,364,452 | B1 * | 4/2002 | Noyes et al. | 347/43 |
| 6,409,318 | B1 * | 6/2002 | Clark | 347/65 |

FOREIGN PATENT DOCUMENTS

| | | |
|---|---|---|
| EP | 0 649 746 | 4/1995 |
| EP | 1 176 021 | 1/2002 |
| JP | 2000-71439 | 3/2000 |
| JP | 2000-79710 | 3/2000 |
| JP | 3058493 | 4/2000 |
| JP | 2000-177150 | 6/2000 |
| JP | 2001-150654 | 6/2001 |

* cited by examiner

*Primary Examiner*—Lamson Nguyen
(74) *Attorney, Agent, or Firm*—Fitzpatrick, Cella, Harper & Scinto

(57) ABSTRACT

Print data is generated for being printed by an ink-jet printing apparatus, which has a first mode for high-speed printing and a second mode for high-quality printing, for performing multiple-pass printing by an ink-jet printhead provided with orifices for discharging ink droplets of large volume and orifices for discharging ink droplets of small volume. When the print data is generated, a user is allowed to select whether specified image data should be printed in the first or second mode. When image data is converted to print data in accordance with the mode selected, the number of ink droplets of the small volume, which are used to print an area of high density or high saturation in regard to a prescribed color in the first mode, is set to be less than the number of ink droplets of the small volume used in printing this area in the second mode.

17 Claims, 11 Drawing Sheets

INK-JET PRINTING METHOD, PRINTING SYSTEM, INK-JET PRINTING APPARATUS, PRINT DATA GENERATING METHOD, PROGRAM AND PRINTER DRIVER

FIELD OF THE INVENTION

This invention relates to an ink-jet printing method, a printing system, an ink-jet printing apparatus, a print data generating method, a program and a printer driver. More particularly, the invention relates to generation of print data for being printed by an ink-jet printing apparatus, which has a first mode for high-speed printing and a second mode for high-quality printing, in which printing is performed by scanning a carriage over a print medium, the carriage mounting an ink-jet printhead provided with orifices for discharging ink droplets of a first volume and orifices for discharging ink droplets of a second volume smaller than the first volume.

BACKGROUND OF THE INVENTION

Printers for printing desired information such as text and images on a sheet-like print medium such as paper or film are in wide use as information printing devices in word processors, personal computers and facsimile machines, etc.

A variety of printing methods used in printers are known in the art. In recent years, however, the ink-jet printing method has become the focus of attention because this method allows contactless printing on print media such as paper, readily lends itself to color printing and is extremely quiet. In terms of the structure thereof, serial printing is in wide use generally owing to low cost and compactness. In serial printing, the apparatus is equipped with a mounted printhead that discharged ink in accordance with desired print information and printing is carried out while the printhead is scanned back and forth in a direction that intersects the direction in which the print medium is fed.

Generally, in a color ink-jet printer, images are often expressed using the three colors of cyan (C), magenta (M) and yellow (Y) or these three colors and the color black (K). Recently, in order to provide even better image quality, there have been proposed a system (a variable-dot ink system), in which amount of ink discharged is varied in such a manner that dots formed by the same ink will differ in size, and a system (color ink system), in which a plurality of inks of the same color system but of different densities are used for the purpose of raising tonality.

A method of discharging ink droplets of different volumes from the same nozzle has been proposed as a method of obtaining different volumes of discharged ink (e.g., see the specification of Japanese Patent No. 3058493). According to this method, it is known to provide two or more types of heaters of different sizes in a case where the ink droplets are discharged utilizing thermal energy, or to control voltage, which is applied to a piezoelectric element, in several stages in a case where the ink droplets are discharged by compressing an ink chamber using the piezoelectric element.

However, in a case where ink droplets of different sizes are discharged from the same nozzle, it is difficult to reduce the size of the nozzle and to control the discharge of ink stably.

It is believed that the above problems can be solved if a nozzle row for discharging large ink droplets and a nozzle row for discharging small ink droplets are provided. In this apparatus, stable control of ink discharge can be achieved because each nozzle only discharges ink droplets of one size.

Furthermore, in an apparatus having a plurality of nozzle rows that thus discharge inks of different volumes, an advantage is that the quality of the printed image is improved.

More specifically, owing to advances made in raising nozzle density and improving definition, minute manufacturing error occurs on a per-nozzle basis in the manufacturing process of the printhead and this causes variations in amount of ink discharged and in discharge direction on a pre-nozzle basis. Stripes and unevenness appear in images printed by such a printhead and a decline in image quality results.

However, in an arrangement equipped with a plurality of nozzle rows that discharge ink droplets of different volumes, the same pixel (dot) can be printed using different nozzle rows in a single scan. This means that even if multiple-pass printing is not carried out, one pixel is printed by a plurality of ink droplets discharged from different nozzles, and therefore the effects of differences in individual nozzles are mitigated, thereby reducing stripes and unevenness and improving image quality.

For the above reasons, ink-jet printers that carry out high-quality printing are believed to be advantageous in terms of the structure having a plurality of nozzle rows that discharge ink droplets of different volumes.

However, adopting an arrangement having a plurality of nozzle rows for discharging ink droplets of different volumes leads to a unique problem, which will now be described.

FIG. 2 is a diagram in which an ink-jet printhead unit is seen from a printed surface, the unit having two nozzle rows per color for discharging ink droplets of different volumes. In the example illustrated, one printhead is provided with one nozzle row. Starting from the left side in FIG. 2, printheads are disposed in the following order: a printhead 11C for discharging cyan (C) ink droplets of large volume, a printhead 11*sc* for discharging cyan (sc) ink droplets of small volume, a printhead 11M for discharging magenta (M) ink droplets of large volume, a printhead 11*sm* for discharging magenta (sm) ink droplets of small volume, a printhead 11Y for discharging yellow (Y) ink droplets of large volume, and a printhead 11*sy* for discharging yellow.(sy) ink droplets of small volume.

Each printhead has 128 nozzles at a pitch of 600 dpi. The printheads 11C, 11M, 11Y discharge ink droplets of approximately 5 ng as ink droplets of large volume (dots of large size), and the printheads 11*sc*, 11*sm*, 11*sy* discharge ink droplets of approximately 2 ng as ink droplets of small volume (dots of small size).

As will be understood from the drawings, a printhead that discharges large dots and a printhead that discharges small dots of the same color are arranged next to each other. The reason for this is that when two printheads using the same color ink are arranged next to each other, an advantage gained is that a common ink tank can be employed for these two printheads, thereby making it possible to simplify the passageway from the ink tank to the printhead.

FIG. 10 is a schematic view illustrating printing in progress as seen from the side. Here only the cyan printheads are shown in order to simplify the description. A printhead unit 5 is provided with the printhead 11C that discharges large dots Cd and the printhead 11*sc* that discharges small dots scd. The ink droplets are discharged toward printing paper 7 in accordance with an image signal while a carriage is being moved in the direction of the arrow.

Since the ink droplets are discharged while the carriage is moving, the discharged ink droplets have a velocity component in the traveling direction of the carriage. As a consequence, the ink droplets are subjected to the effects of air currents and this has an effect upon ink impact position. In particular, the small dots scd also are affected by turbulence produced by the large dots Cd discharged from the neighboring printhead 11C. This makes it difficult to control the impact position. As a result, a disturbance is produced in the impact position of the small dots, this disturbance in impact position appears as stripes and unevenness in the printed image and causes a decline in the quality of the printed image. The larger the number of large dots discharged, the more pronounced this phenomenon becomes.

SUMMARY OF THE INVENTION

Accordingly, an object of the present invention is to suppress the occurrence of stripes and unevenness ascribable to the effects of air currents, thereby making it possible to print an image having a high image quality.

An ink-jet printing method according to an aspect of the present invention is an ink-jet printing method for performing printing by scanning an ink-jet printhead over a print medium, the ink-jet printhead having orifices for discharging ink droplets of a first volume and orifices for discharging ink droplets of a second volume smaller than the first volume, the method comprising, a selecting step of selecting a mode, which is to be used in printing, from a first mode in which printing in a prescribed area on the print medium is completed in a predetermined time, and a second mode in which printing in the prescribed area is completed in a time longer than the predetermined time, a data generating step of executing data processing and generating print data in accordance with the mode selected, and a printing step of carrying out printing by discharging ink toward the print medium from the ink-jet printhead based upon the print data generated, wherein in the data generating step, data processing is executed in such a manner that a number of ink droplets of the second volume used in printing an area of a high density or high saturation in regard to a prescribed color in the first mode will be less than a number of ink droplets of the second volume used in printing this area in the second mode.

Further, an ink-jet printing method according to another aspect of the present invention is an ink-jet printing method for performing printing by scanning an ink-jet printhead over a print medium, the ink-jet printhead having orifices for discharging ink droplets of a first volume and orifices for discharging ink droplets of a second volume smaller than the first volume, the method comprising, a selecting step of selecting a mode, which is to be used in printing, from a first mode in which printing in a prescribed area on the print medium is performed by scanning the ink-jet printhead a predetermined number of times and a second mode in which printing in the prescribed area is performed by scanning the ink-jet printhead a number of times greater than the predetermined number of times, an image processing step of executing image processing that conforms to the mode selected, and a printing step of carrying out printing by discharging ink toward the print medium from the ink-jet printhead based upon data that has undergone the image processing, wherein the image processing step is such that (A) in a case where the first mode has been selected, image processing is executed in such a manner that a maximum-density area, which is an area of maximum density with regard to a prescribed color, or a maximum-saturation area, which is an area of maximum saturation with regard to a prescribed color, will be printed using the ink droplets of the first volume rather than the ink droplets of the second volume, and (B) in a case where the second mode has been selected, image processing is executed in such a manner that the maximum-density area or maximum-saturation area will be printed using both the ink droplets of the first volume and the ink droplets of the second volume.

Further, the foregoing object is also attained by providing a printing system, an ink-jet printing apparatus, a print data generating method, a program and a printer driver for implementing the functions of the above-described printing method.

Specifically, according to one aspect of the present invention, when printing is carried out by scanning, back and forth across a print medium, an ink-jet printhead having orifices for discharging ink droplets of a first volume and orifices for discharging ink droplets of a second volume smaller than the first volume, a mode to be used in printing is selected from a first mode, in which printing in a prescribed area on the print medium is completed in a predetermined time, and a second mode, in which printing in the prescribed area is completed in a time longer than the predetermined time, data processing is executed and print data is generated in accordance with the mode selected, and printing is carried out by discharging ink toward the print medium from the ink-jet printhead based upon the print data generated. In the generation of the print data, data processing is executed in such a manner that the number of ink droplets of the second volume used in printing an area of a high density or saturation in regard to a prescribed color in the first mode will be less than the number of ink droplets of the second volume used in printing in this area in the second mode.

Further, according to another aspect of the present invention, when printing is carried out by scanning, back and forth across a print medium, an ink-jet printhead having orifices for discharging ink droplets of a first volume and orifices for discharging ink droplets of a second volume smaller than the first volume, a mode to be used in printing is selected from a first mode, in which printing is performed in a prescribed area on the print medium by scanning the ink-jet printhead a predetermined number of times, and a second mode, in which printing is performed in the prescribed area by scanning the ink-jet printhead a number of times greater than the predetermined number of times, image processing conforming to the mode selected is executed and printing is carried out by discharging ink toward the print medium from the ink-jet printhead based upon data that has undergone the image processing. (A) In a case where the first mode has been selected, image processing is executed in such a manner that a maximum-density area, which is an area of maximum density with regard to a prescribed color, or a maximum-saturation area, which is an area of maximum saturation with regard to a prescribed color, will be printed using the ink droplets of the first volume rather than the ink droplets of the second volume; and (B) in a case where the second mode has been selected, image processing is executed in such a manner that the maximum-density area or maximum-saturation area will be printed using both the ink droplets of the first volume and the ink droplets of the second volume.

As a result of this arrangement, when high-speed printing of short printing time or small number of scans is carried out, the number of small ink droplets is reduced in the printing of an area of high density or saturation in which many ink droplets of large size are used, thereby preventing the occurrence of stripes or unevenness ascribable to a disturbance in the impact position of small ink droplets due to the influence of air currents. On the other hand, when high-quality printing requiring more time for printing or involving a larger number of scans than in the case of high-speed printing is carried out, the number of small ink droplets is made larger than that in the case of high-speed printing also in the printing of an area of high density or saturation in which many ink droplets of large size are used, thereby making it possible to print an area of high density or saturation at an even higher density or saturation. A high-quality image of improved tonality is thus obtained.

Accordingly, when high-speed printing is carried out, a high-density area is printed upon making the number of small dots used comparatively small or without using any small dots at all. The occurrence of stripes or unevenness in high-density areas can thus be suppressed, enabling printing to be performed at high speed with no decline in image quality. On the other hand, when high-quality printing is carried out, a high-density area is printed upon making the number of small dots used comparatively large, thereby making it possible to print an image having a high tonality and, at the same time, to suppress the occurrence of stripes and unevenness by using a plurality of printheads.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

In this specification, "print" is not only to form significant information such as characters and graphics, but also to form, e.g., images, figures, and patterns on printing media in a broad sense, regardless of whether the information formed is significant or insignificant or whether the information formed is visualized so that a human can visually perceive it, or to process printing media. "Print media" are any media capable of receiving ink, such as cloth, plastic films, metal plates, glass, ceramics, wood, and leather, as well as paper sheets used in common printing apparatuses.

Furthermore, "ink" (to be also referred to as a "liquid" hereinafter) should be broadly interpreted like the definition of "print" described above. That is, ink is a liquid which is applied onto a printing medium and thereby can be used to form images, figures, and patterns, to process the printing medium, or to process ink (e.g., to solidify or insolubilize a colorant in ink applied to a printing medium).

First Embodiment

A first embodiment of the present invention is a printing system comprising an ink-jet printer and a host computer.

Figure 1:
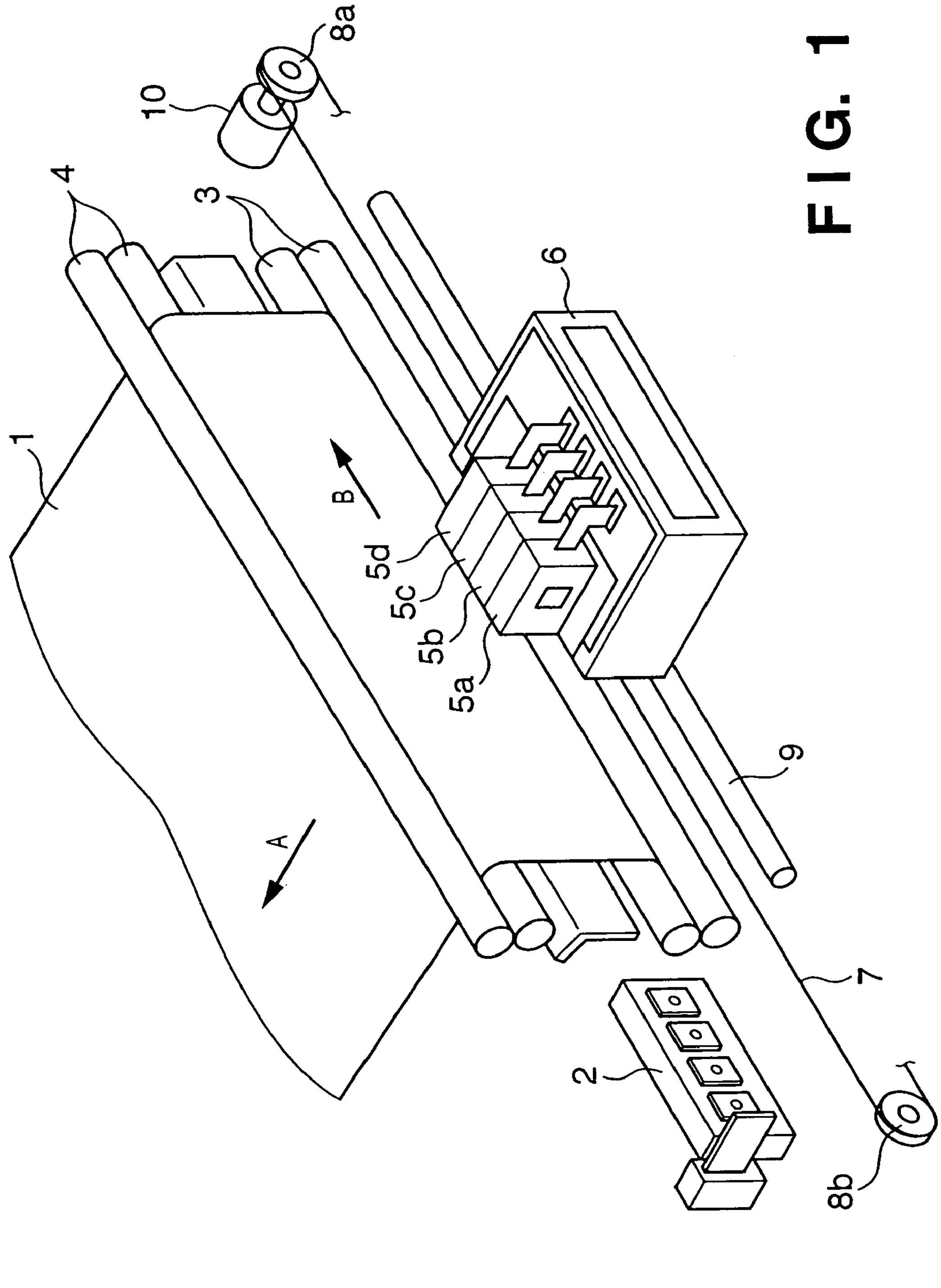
FIG. 1 is an external perspective view illustrating the structure of an ink-jet printer according to a first embodiment of the present invention.

FIG. 1 is an external perspective view illustrating the structure of the ink-jet printer of this embodiment. Reference numeral 1 denotes a print medium (print sheet) such as a sheet of paper or plastic. A plurality of the sheets 1 stacked in a cassette or the like are supplied one sheet at a time by feed rollers (not shown). The supplied print sheet 1 is transported in the direction of arrow A by first and second transport roller pairs 3 and 4, respectively, spaced apart at fixed intervals and driven by respective ones of transport motors (not shown).

Reference numeral 5 denotes a printhead unit having ink-jet printheads, which are for printing on the print sheet 1, and ink tanks. Inks contained in a black (K) ink tank 5*a*, cyan (C) ink tank 5*b*, magenta (M) ink tank 5*c* and yellow (Y) ink tank 5*d* are supplied to printheads (not shown) disposed in a plane facing the print sheet 1 and are discharged from the nozzles of each of the printheads in accordance with an image signal. The printhead unit 5 is mounted on a carriage 6, and a carriage motor 10 is coupled to the carriage 6 via a belt 7 and pulleys 8*a*, 8*b*. Accordingly, it is so arranged that the carriage 6 is scanned back and forth along a guide shaft 9 by driving the carriage motor 10.

By virtue of this arrangement, an image is printed by discharging ink toward the print sheet 1 in accordance with an image signal while the printhead unit 5 is moved in the direction of arrow B. When necessary, the printhead unit 5 is returned to a home position to have clogged nozzles unclogged by a recovery unit 2. In addition, the print sheet 1 is transported in the direction of arrow A over a distance that conforms to the setting of a printing mode (described later) by driving the transport roller pairs 3, 4 by their transport motors. A desired image is printed on the print sheet 1 by repeating the above operation.

Figure 2:
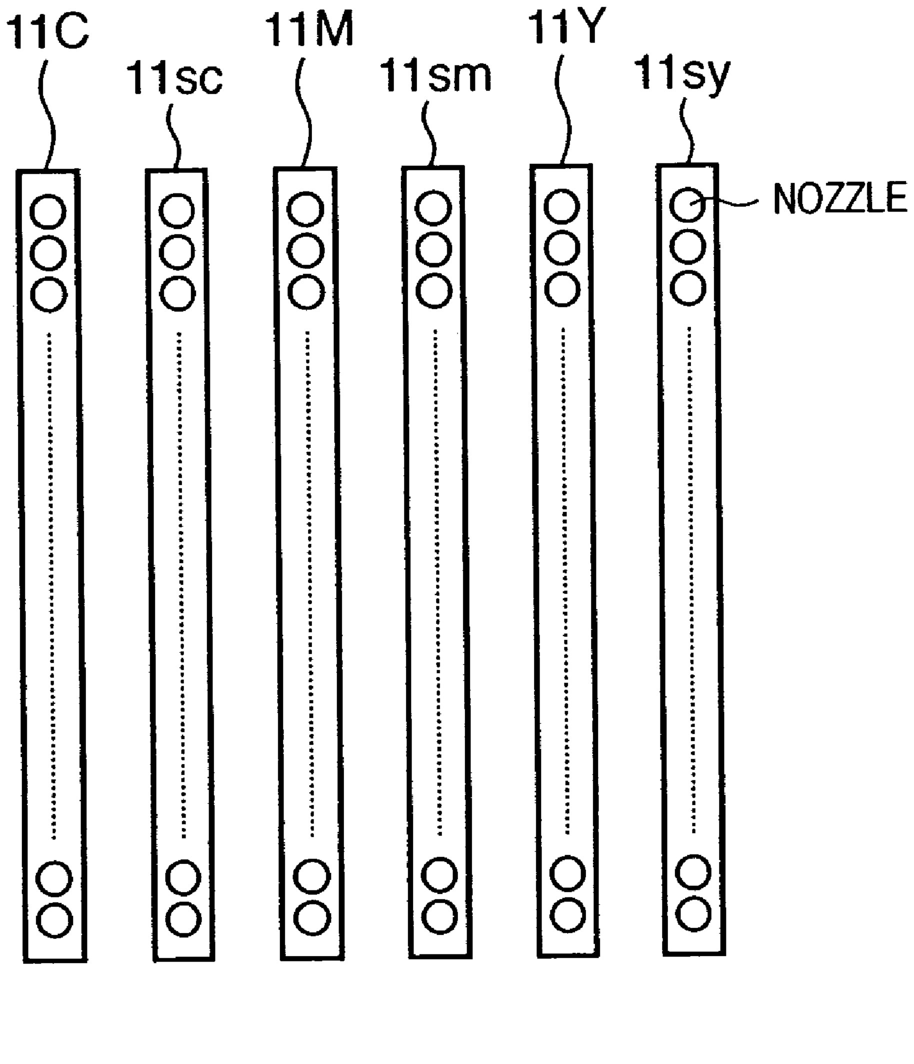
FIG. 2 is a diagram illustrating an arrangement of a printhead unit applicable to the ink-jet printer of FIG. 1.

The structure of the printhead unit 5 in this embodiment is similar to that shown in FIG. 2 described above, and the volumes of the ink droplets discharged from each of the printhead are similar to that of FIG. 2. That is, the printhead unit 5 is equipped with two printheads, one for large dots and one for small dots, for each of the colors cyan (C), magenta (M) and yellow (Y). The ink-jet printhead of this embodiment also has printheads for discharging black (K) ink, as has been described in connection with FIG. 1. However, use is made of the black printheads only when monochrome printing is performed. In the description that follows, a case where color printing that does not employ the black printheads is performed will be discussed. For this reason, a description relating to the back printheads will be omitted.

Figure 11:
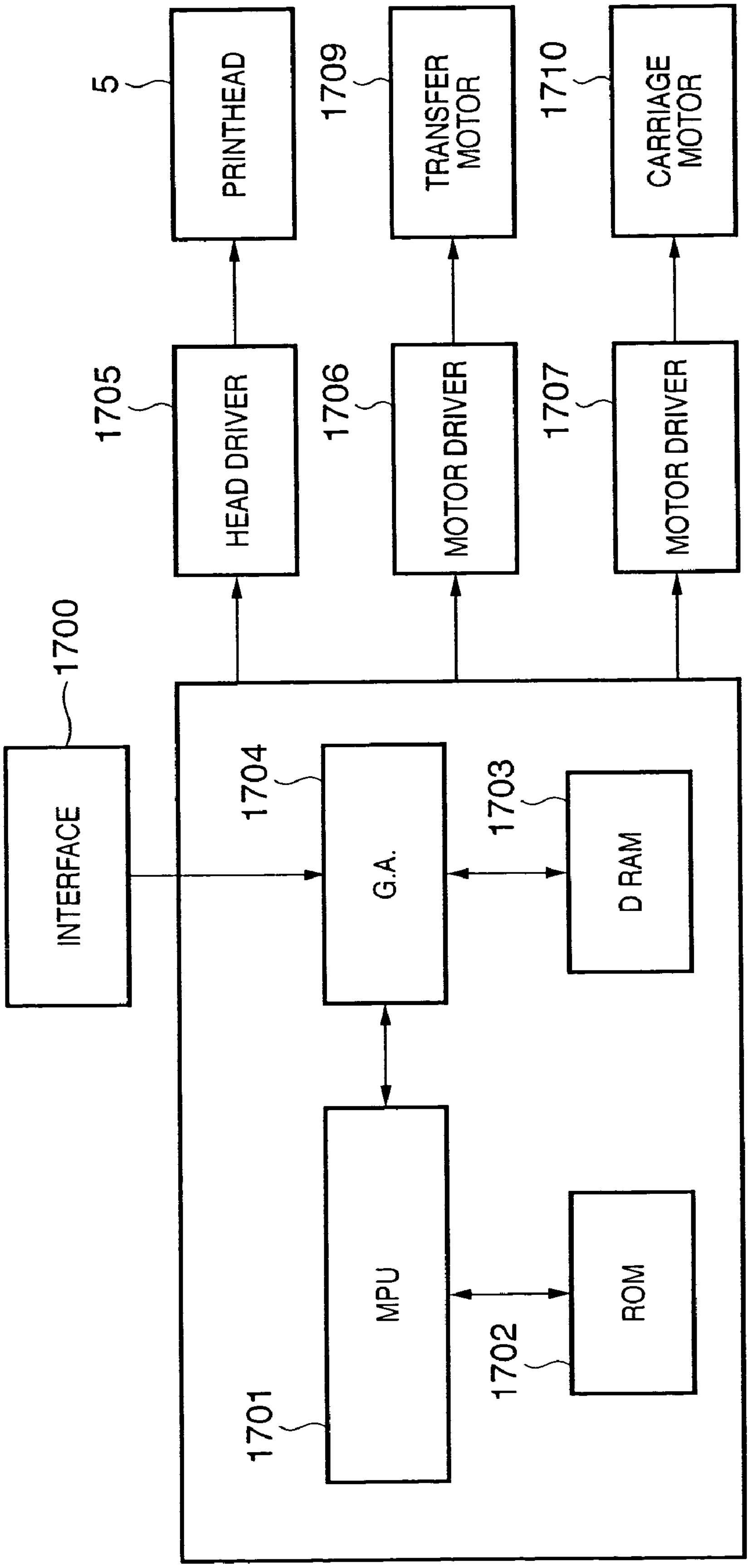
FIG. 11 is a block diagram showing an arrangement of a control circuit of the ink-jet printer illustrated in FIG. 1.

FIG. 11 is a block diagram showing the arrangement of a control circuit of the ink-jet printer. Referring to FIG. 11 showing the control circuit, reference numeral 1700 denotes an interface for inputting a print signal from an external unit such as a host computer; 1701, an MPU; 1702, a ROM for storing a control program (including character fonts if necessary) executed by the MPU 1701; and 1703, a DRAM for storing various data (the print signal, print data supplied to the printing head and the like). Reference numeral 1704 denotes a gate array (G. A.) for performing supply control of print data to the printhead unit 5. The gate array 1704 also performs data transfer control among the interface 1700, the MPU 1701, and the RAM 1703. Reference numeral 1710 denotes a carrier motor for transferring the printhead in the main scanning direction; and 1709, a transfer motor for transferring a paper sheet. Reference numeral 1705 denotes a head driver for driving the printhead unit; and 1706 and 1707, motor drivers for driving the transfer motor 1709 and the carrier motor 1710.

The operation of the above control arrangement will be described below. When a print signal is inputted into the interface 1700, the print signal is converted into print data for a printing operation between the gate array 1704 and the MPU 1701. The motor drivers 1706 and 1707 are driven, and the printhead unit is driven in accordance with the print data supplied to the head driver 1705, thus performing the printing operation.

Though the control program executed by the MPU 1701 is stored in the ROM 1702, an arrangement can be adopted in which a writable storage medium such as an EEPROM is additionally provided so that the control program can be altered from a host computer connected to the ink-jet printer.

Figure 3:
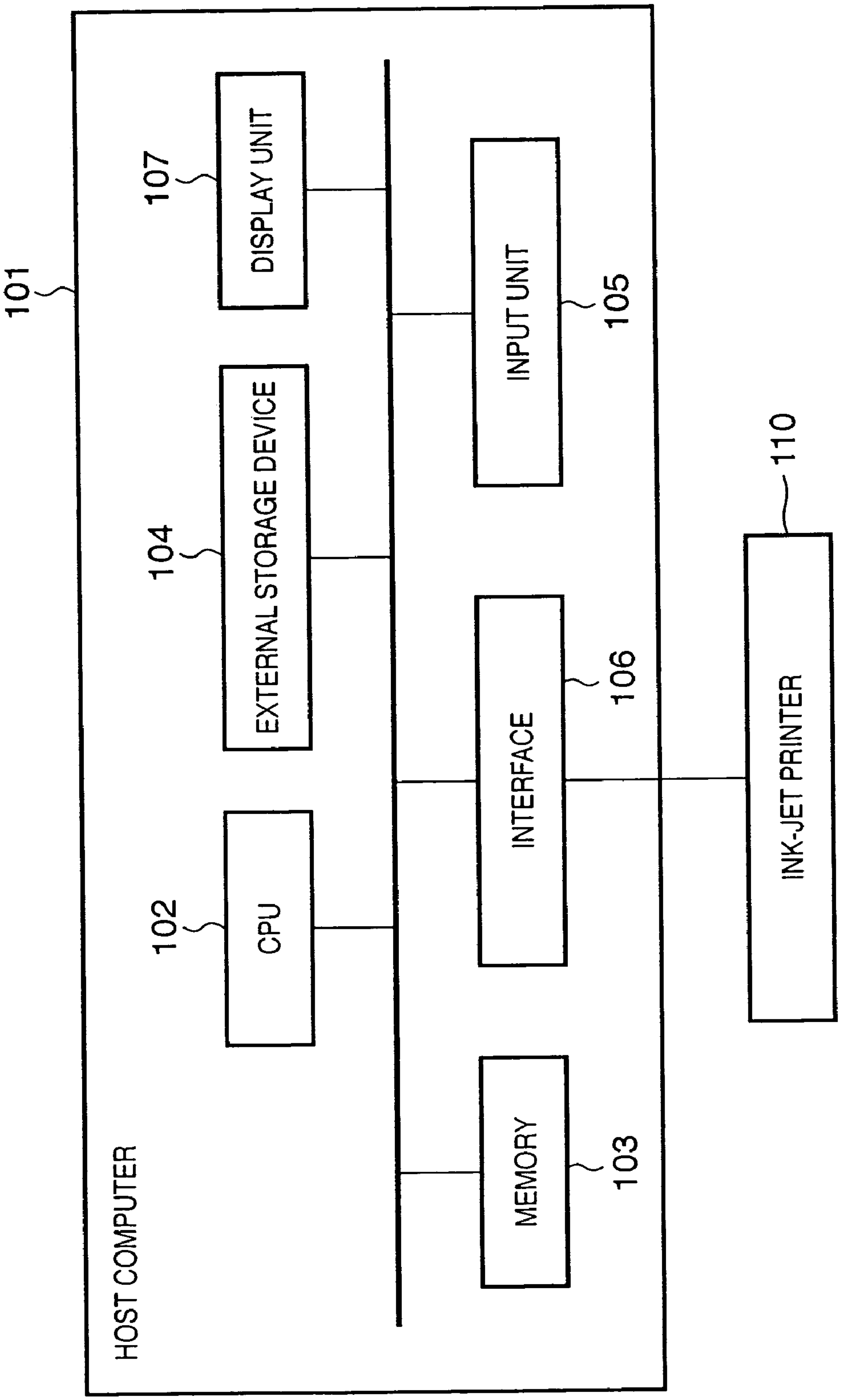
FIG. 3 is a block diagram illustrating a host computer according to the first embodiment.

FIG. 3 is a block diagram illustrating the structure of a host computer 101 according to the first embodiment for outputting print data to the ink-jet printer described above. The host computer 101 in FIG. 3 includes a CPU 102 for exercising overall control; a memory 103 for storing a program and used as a work area; an external storage device 104 such as a floppy-disk drive or CD-ROM drive; an input unit 105 such as a keyboard and mouse operated by a user; an interface 106 for interfacing a printer; and a display unit 107 for displaying user information to the user.

As will be described below, the CPU 102 executes a program that has been stored in the memory 103, thereby executing image processing such as color processing and quantization processing, described later. This program may be stored in the external storage device 104 or may be supplied from an external unit, not shown. The host computer 101 is connected to an ink-jet printer 110 via the interface 106, and printing is performed upon transmitting print data, which has undergone image processing, to the ink-jet printer 110.

Figure 4:
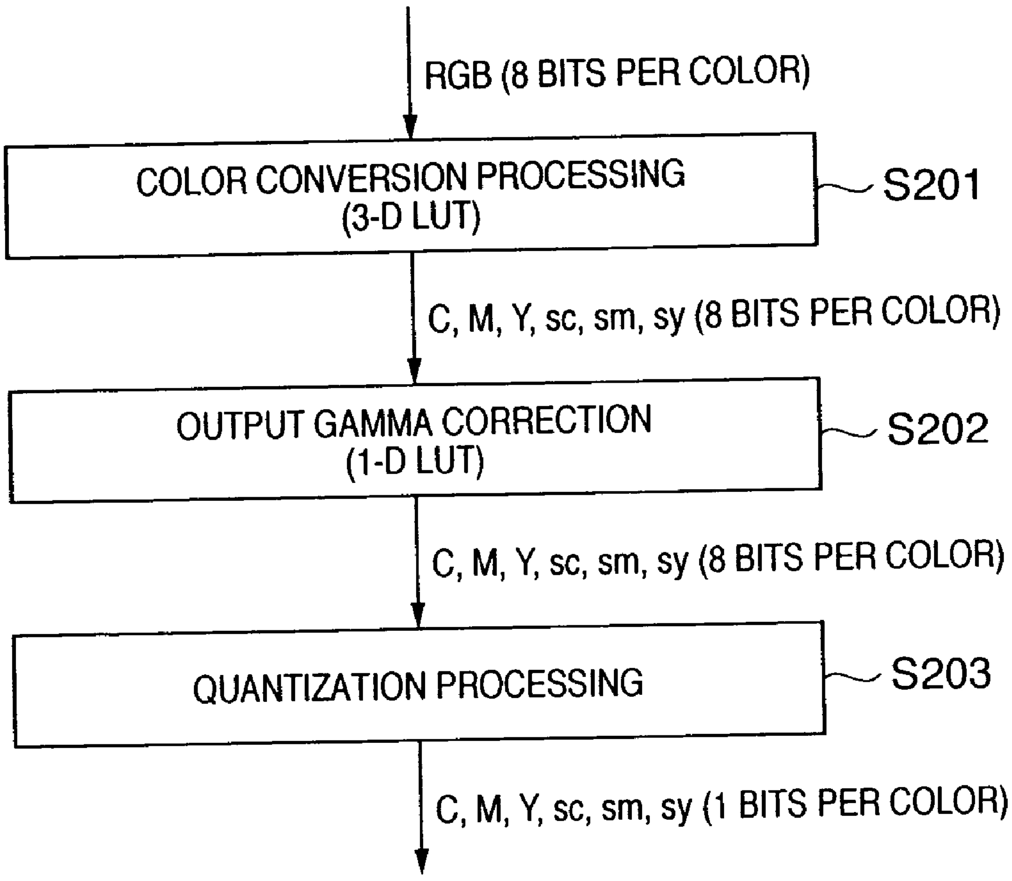
FIG. 4 is a diagram illustrating the flow of image processing according to the first embodiment.

FIG. 4 is a block diagram for describing image processing executed by the host computer of this embodiment. This flowchart illustrates the processing flow for outputting applied image data, which is composed of eight bits for each of the colors RGB (for a total of 256 colors), as 1-bit print data for each of C, M, Y, sc, sm and sy.

The data represented by eight bits for each of the colors RGB is first applied to a color converting processor 201. Here color conversion processing is applied to the 8-bit data of each of C, M, Y, sc, sm, sy, which have been made to conform to the output format of the printer, by a three-dimensional look-up table (LUT). This color conversion processing is processing for making a conversion from the RGB-system color of the input system to the CMY-system color of the output system. In the host computer, image data is displayed on a light-emitting body such as a monitor and therefore is often expressed by the three primary colors (R, G, B) of an additive mixture of color stimuli. In a printer, however, use is made of CMY colorants, which are the three primary colors of a subtractive mixture of color stimuli, and therefore such conversion processing is executed.

It should be noted that the three-dimensional LUT used in color conversion processing retains data in discrete form. Though data other than the retained data is found by interpolation processing, the interpolation processing is well-known art and the details thereof need not be described.

The data composed of eight bits for each of C, M, Y, sc, sm, sy that has undergone color conversion processing is subjected to output gamma correction processing by a one-dimensional LUT in an output gamma correction unit 202. This is carried out in order to assure a linear relationship between each 8-bit input level and the output characteristic at this time by applying an output gamma correction. This is because, in many cases, the relationship between number of print dots per unit area and the output characteristic (reflection density, etc.) is not linear.

The entered data of eight bits of each of the colors RGB is converted to 8-bit data corresponding to each of the printheads C, M, Y, sc, sm, sy of the ink-jet printer by the above-described color conversion processing and output gamma correction processing.

The ink-jet printer of this embodiment is a binary printing apparatus that performs printing by the absence or presence of ink. Each of the items of 8-bit data is quantized to 1-bit binary data by a quantizing processor 203. The well-known error diffusion method or dither method is used as the quantization method employed here.

Figure 5:
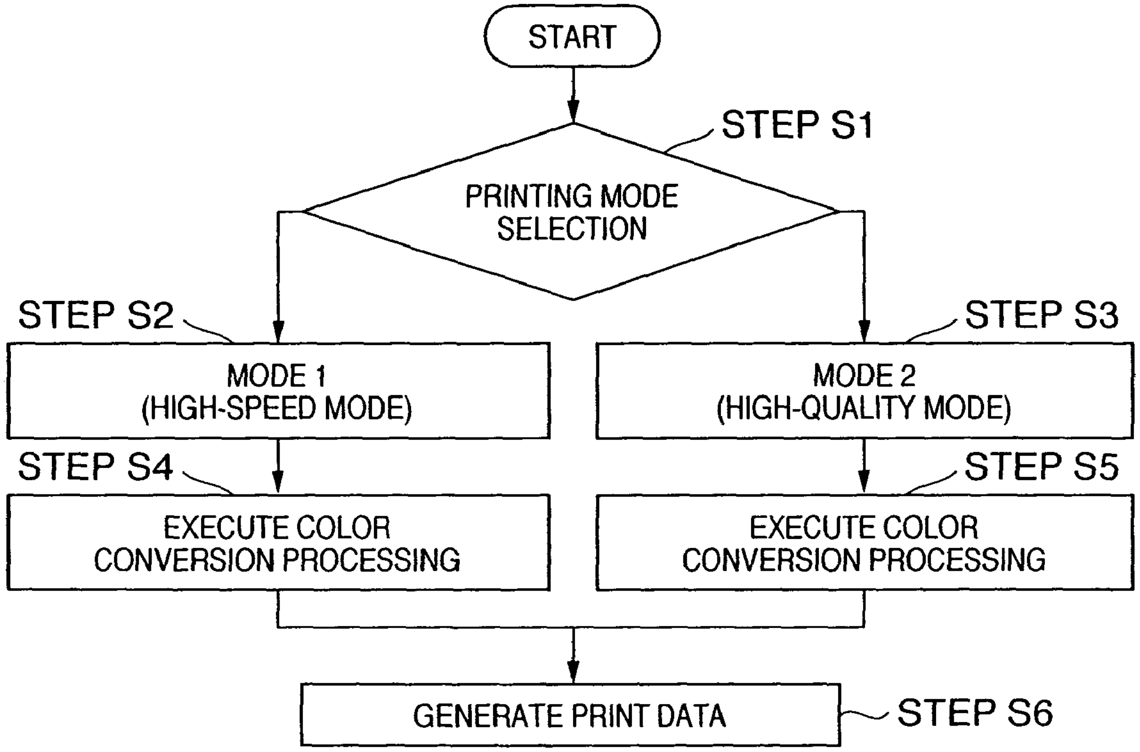
FIG. 5 is a flowchart illustrating the flow of processing for creating print data according to the first embodiment.

FIG. 5 is a flowchart illustrating the flow of processing for generating print data according to this embodiment. The processing illustrated here is executed by starting up the printer driver of the ink-jet printer installed in the above-mentioned host computer and having the user perform an input operation.

First, the user selects the printing mode at step S1 in FIG. 5. The ink-jet printer of this embodiment is provided with a plurality of printing modes that include the following two modes: a high-speed mode (mode 1), in which high-speed processing is performed but image quality declines, and a high-quality mode (mode 2), in which high-quality printing is performed but printing speed is low. The user is capable of selecting the printing mode in conformity with the purpose of printing and the degree of image quality desired.

The ink-jet printer according to this embodiment performs printing by scanning a prescribed printing area (an area corresponding to one raster that extends in the main-scan direction of the printhead) a plurality of times, thereby carrying out multiple-pass printing. Here "N-pass printing" shall signify printing the prescribed printing area by scanning the printhead N times (where N represents an integer and N=2 holds) in the main-scan direction. In mode 1, "4-pass printing" is executed, while "16-pass printing" is executed in mode 2. This embodiment is described in regard to an example in which the high-speed mode (mode 1) is made 4-pass printing and the high-quality mode (mode 2) is made 16-pass printing. However, the specific number of passes is not limited to these values. It will suffice if the number of passes in the high-speed mode (mode 1) has been set to be smaller than the number of passes in the high-quality mode (mode 2). Thus, according to this embodiment, the mode in which printing is performed with a comparatively small number of passes is defined as the high-speed mode (mode 1), and the mode in which printing is performed with a comparatively large number of passes is defined as the high-quality mode (mode 2).

The printing mode that has been selected at step S1 is determined at steps S2 and S3. In accordance with the printing mode determined, a color conversion is applied at steps S4 and S5 through the flow of processing shown in FIG. 4. Parameters used in the color conversion processing have been set to unique values specific to each of the modes. That is, in this embodiment, the parameters of color conversion processing differ depending upon the printing mode that has been selected. Control then proceeds to step S6, at which quantization processing of the kind described in connection with FIG. 4 is executed and print data is generated.

Figure 6A:
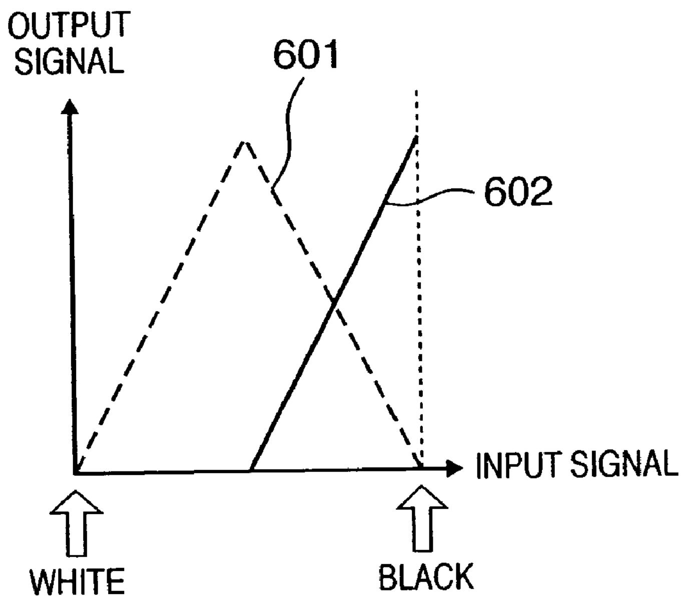
FIGS. 6A and 6B are diagrams illustrating output values of large and small dots plotted against an input signal according to the first embodiment.
Figure 6B:
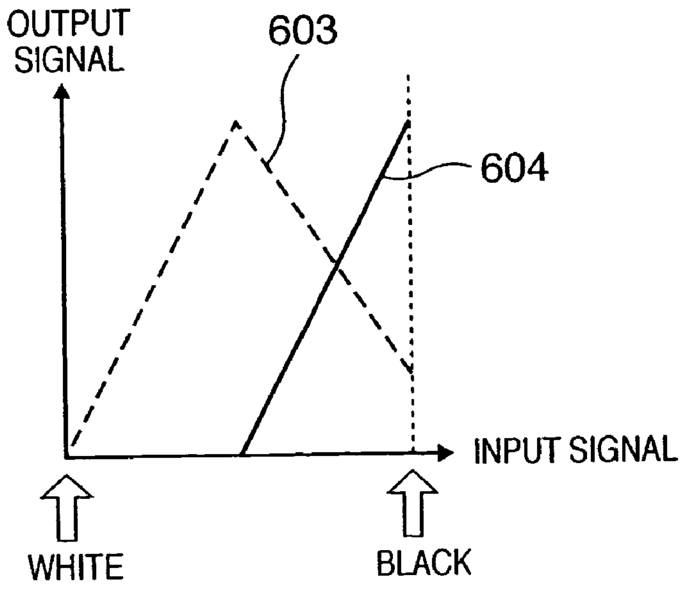

FIGS. 6A and 6B are diagrams illustrating changes in numbers of large and small dots used according to this embodiment, in which gradation shifts from white to black. Each diagram corresponds to a three-dimensional LUT that provides the parameters of processing executed at the color-conversion processing step 201 in FIG. 4. Curves 601 and 603 indicated by the dashed lines represent change in the output signal with regard to small dots, and curves 602 and 604 indicated by the solid lines represent change in the output signal with regard to large dots.

In order to simplify the description, it is assumed here that the values of CMY are the same for both large and small dots. "White", namely an input signal for which R=G=B=255 holds, is taken on the left side of the graphs, and "black", namely an input signal for which R=G=B=0 holds, is taken on the right side of the graphs. Points between "white" and "black" correspond to grays, namely input signals for which R=G=B=1 to 255 holds.

FIG. 6A corresponds to a conversion table of mode 1 (the high-speed mode), and FIG. 6B corresponds to a conversion table of mode 2 (the high-quality mode). Regardless of the mode, an area in which the color is near white (a low-density are having a density lower than a predetermined density) is expressed using only small dots to make the impression of granularity as small as possible. As density rises, the number of small dots is reduced while concurrent use is made of large dots. "Black", which is maximum density, is expressed using only large dots in mode 1; it is expressed using large and small dots conjointly in mode 2.

Thus, in this embodiment, the number of small dots (the output value) prevailing when printing a high density area (a portion in which the unit of printing is composed of one or a plurality of pixels) is smaller in the high-speed mode (mode 1) in comparison with the high-quality mode (mode 2).

In particular, in mode 1, it is so arranged that small dots are not used in the printing of an area of maximum density in which the maximum number of large dots is used, thereby preventing the occurrence of stripes or unevenness ascribable to a disturbance in impact position of the small dots caused by the effects of air currents. In mode 2, on the other hand, the number of passes is large and therefore, taking into account the fact that the number of dots discharged in a single pass diminishes as does the influence upon the impact position of small dots, small dots are used only when printing an area of large density in which the maximum number of large dots is used. In mode 2, therefore, it is possible to make the density of a maximum-density area even higher, as a result of which a high-quality image of improved tonality is obtained.

Thus, in accordance with this embodiment, as described above, when an image containing a black area of high density is printed, the number of small dots used is made comparatively small, or absolutely no small dots are used, in case of high-speed printing, thereby suppressing the occurrence of stripes and unevenness in high-density areas and making it possible to print at high speed without sacrificing image quality to the maximum degree. In case of high-quality printing, on the other hand, the number of passes is increased, thereby making the number of small dots used comparatively large while suppressing the occurrence of stripes and unevenness. This makes it possible to print a high-quality image of improved tonality.

Second Embodiment

The first embodiment relates to a printing system for forming a color image using three types of inks, namely inks of the colors cyan, magenta and yellow. A second embodiment concerns a printing system for forming a color image of higher image quality using black ink in addition to the cyan, magenta and yellow inks.

In a manner similar to that of the first embodiment, this embodiment also is a printing system comprising an ink-jet printer and a host computer. The structures of the ink-jet printer and host computer also are approximately the same with the exception of the structure of the printhead unit in the ink-jet printer and the parameters used when the color conversion processing is executed. Aspects similar to those of the first embodiment need not be described. The description that follows will center on the characterizing features of this embodiment.

Figure 7:
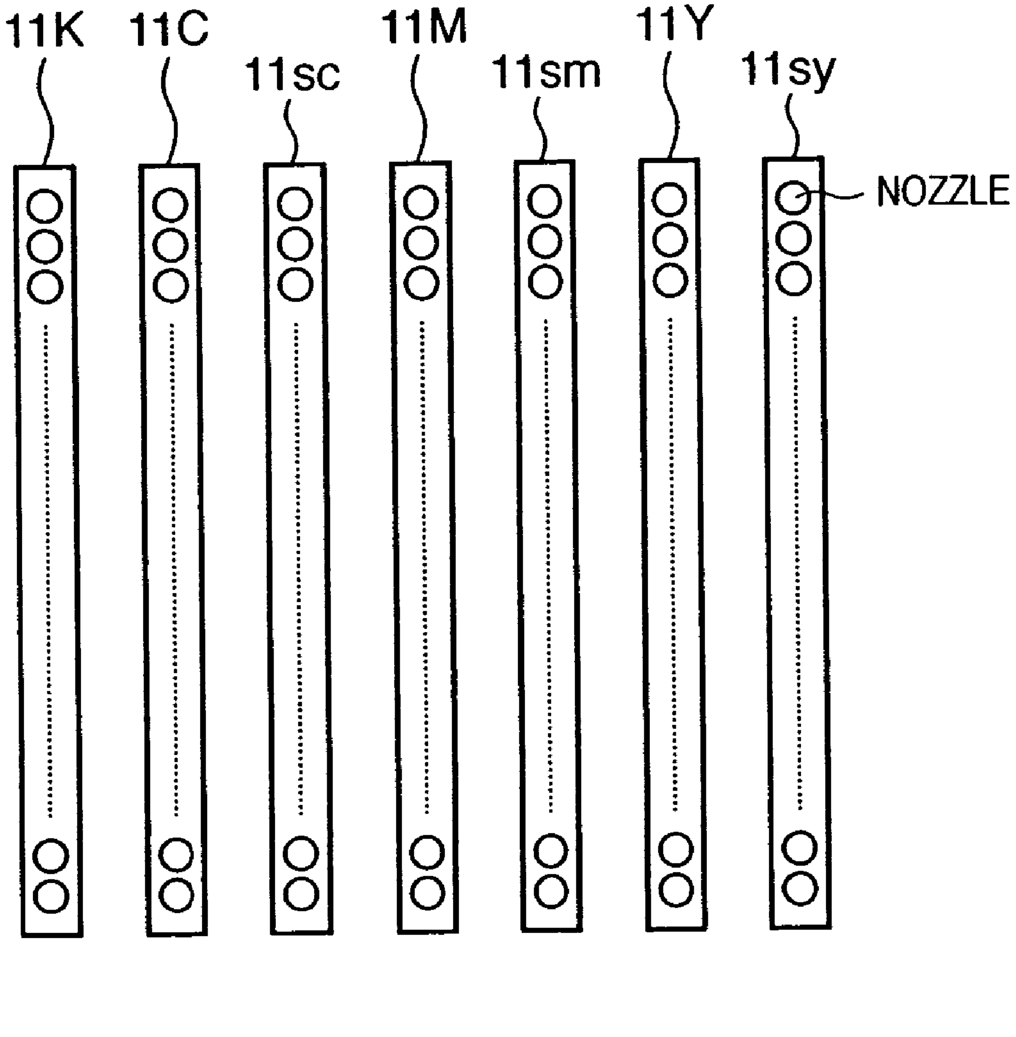
FIG. 7 is a diagram illustrating the arrangement of a printhead unit according to a second embodiment of the present invention.

FIG. 7 is a diagram in which the ink-jet printhead unit 5 according to this embodiment is seen from a printed surface. The ink-jet printhead unit 5 has a printhead 11K for black (K) ink, which is provided on its left in FIG. 7, in addition to the two printheads that discharge large and small dots for each of the colors C, M, Y. The printhead 11K is connected to ink tank 5*a* for black (K) ink. The printhead 11K is provided with 128 nozzles at a pitch of 600 dpi and discharges ink droplets (large dots), which have a volume of approximately 5 ng, from each of the nozzles in accordance with print data. As should be obvious from FIG. 7, rows of large and small nozzles for discharging respective ones of large and small dots are not provided for the black (K); only a row of large nozzles for discharging large dots is provided for black (K).

Figure 8A:
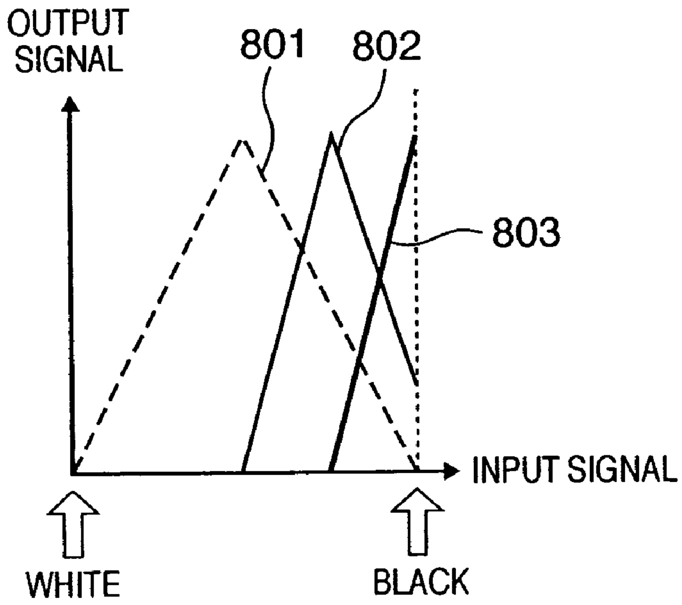
FIGS. 8A and 8B are diagrams illustrating output values of large and small dots plotted against an input signal according to the first embodiment.
Figure 8B:
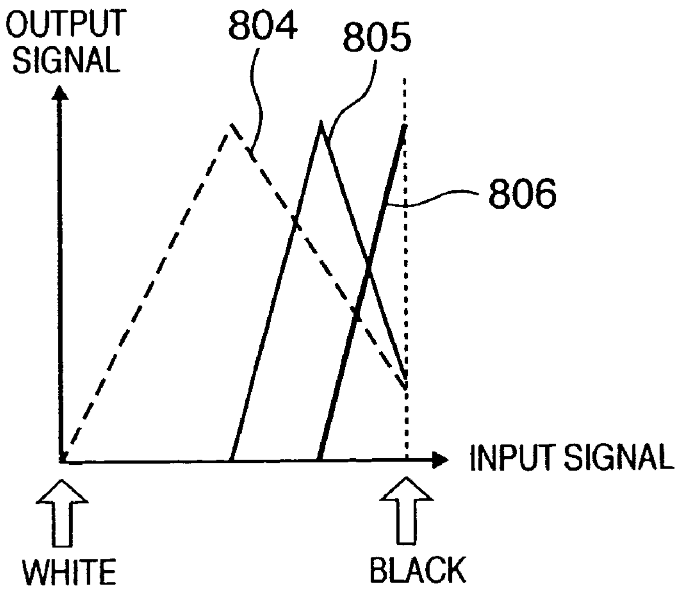

FIGS. 8A and 8B are diagrams illustrating, in a manner similar to that of FIGS. 6A and 6B, how large dots, small dots and black ink droplets (black dots) are used in this embodiment. Each diagram corresponds to a three-dimensional LUT that provides the parameters of processing executed at the color-conversion processing step 201 in FIG. 4. Curves 801 and 804 indicated by the dashed lines represent change in the output signal with regard to small dots, curves 802 and 805 indicated by the solid lines represent change in the output signal with regard to large dots, and curves 803 and 806 indicated by the bold lines represent change in the output signal with regard to black dots.

In a manner similar to that of the first embodiment, FIG. 8A corresponds to a conversion table of mode 1 (the high-speed mode), and FIG. 8B corresponds to a conversion table of mode 2 (the high-quality mode). In this embodiment also, the number of small dots used when printing an area of high density in mode 1 differs from that in mode 2, as illustrated, in a manner similar to that of the first embodiment. In particular, when an area of maximum density (black) is printed, the area is expressed using large dots of the colors CMYK in mode 1 and using large dots of the colors CMYK and small dots of the colors CMY conjointly in mode 2.

Thus, in accordance with this embodiment, when an image containing an area of high cyan density is printed, the number of small dots used is made comparatively small, or absolutely no small dots are used, in case of high-speed printing, thereby suppressing the occurrence of stripes and unevenness in high-density areas and making it possible to print at high speed without sacrificing image quality to the maximum degree. In case of high-quality printing, on the other hand, the number of small dots used is made comparatively large, thereby making it possible to print a high-quality image of improved tonality and devoid of stripes and unevenness.

In this embodiment, “black” of maximum density is expressed by a mixture of black ink and color ink. However, it goes without saying that this may be expressed by black ink only.

Third Embodiment

The first and second embodiments described above are such that when the color black is expressed, the numbers of small dots used to print an area of high density are made to differ in dependence upon the printing mode. A third embodiment is so adapted that when another chromatic color is expressed, the numbers of small dots used to print an area of high density are made to differ in dependence upon the printing mode.

In a manner similar to that of the first and second embodiments, this embodiment also is a printing system comprising an ink-jet printer and a host computer. The structures of the ink-jet printer and host computer also are approximately the same with the exception of the parameters used when the color conversion processing is executed. Aspects similar to those of the first and second embodiments need not be described. The description that follows will center on the characterizing features of this embodiment.

Though a case in which the number of small dots used to print a high-density area is changed in accordance with the printing mode when expressing cyan is described below as an example, the invention is similarly applicable to other chromatic colors. Further, the invention may be applied to a plurality of colors, not just a single color. In such case it is preferred that ink colors such as CMY (and K) or colors such as red, green and blue be supported as the colors applied.

Figure 9A:
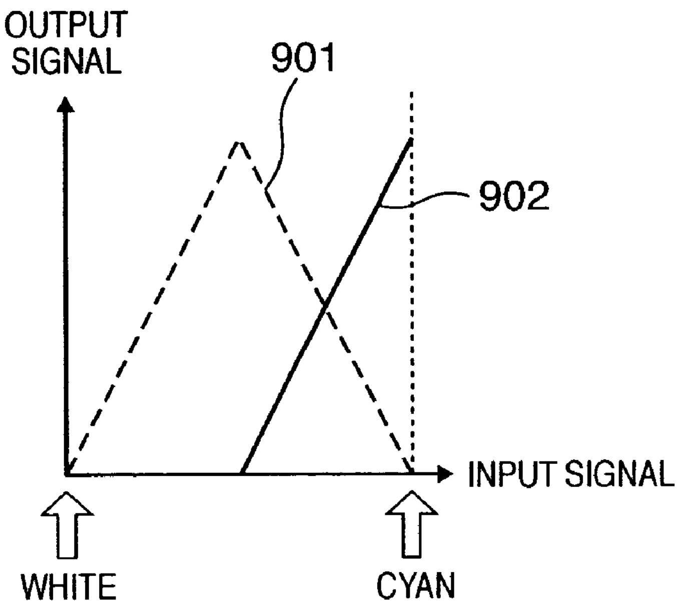
FIGS. 9A and 9B are diagrams illustrating output values of large and small dots plotted against an input signal according to the first embodiment.
Figure 9B:
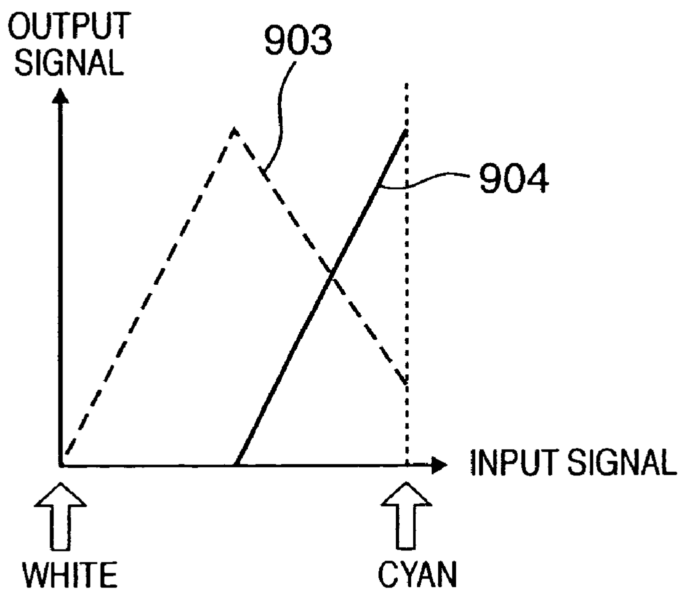
Figure 10:
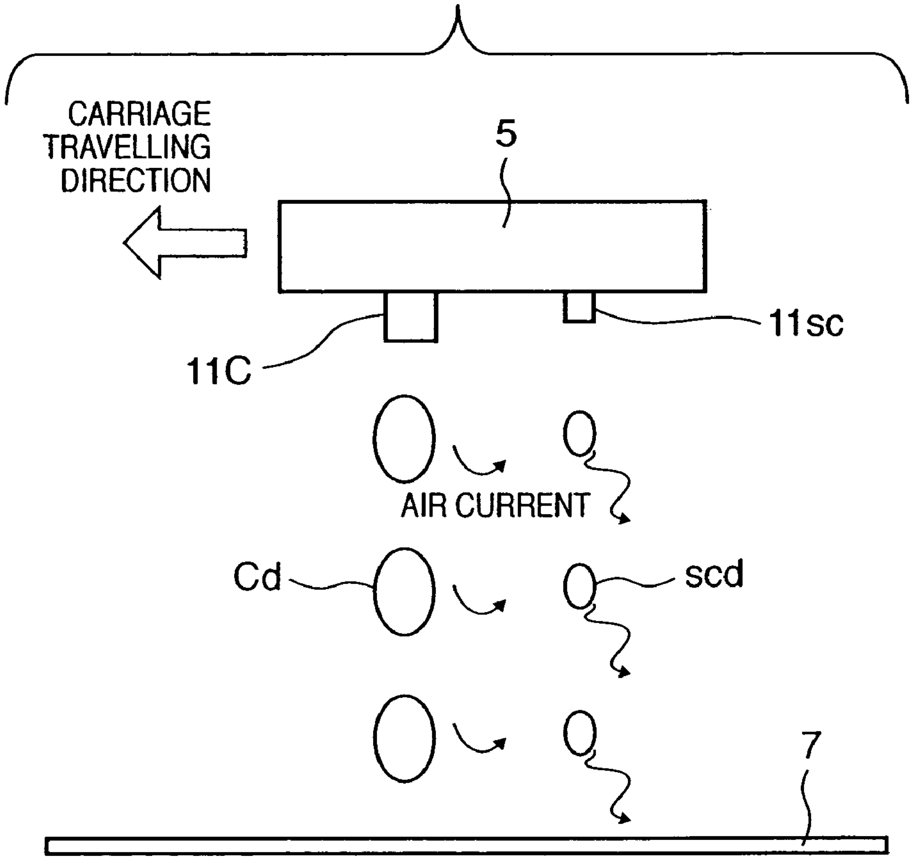
FIG. 10 is a diagram useful in describing a disturbance in impact position caused by air currents.

FIGS. 9A and 9B are diagrams illustrating, in a manner similar to that of FIGS. 6A and 6B, how large dots and small dots are used in this embodiment. Each diagram corresponds to a three-dimensional LUT that provides the parameters of processing executed at the color-conversion processing step 201 in FIG. 4. Curves 901 and 903 indicated by the dashed lines represent change in the output signal with regard to small dots, and curves 902 and 904 indicated by the solid lines represent change in the output signal with regard to large dots.

In a manner similar to that of the first and second embodiments, FIG. 9A corresponds to a conversion table of mode 1 (the high-speed mode), and FIG. 9B corresponds to a conversion table of mode 2 (the high-quality mode). In this embodiment also, the number of small dots used when printing an area of high density in mode 1 differs from that in mode 2, as illustrated, in a manner similar to that of the first embodiment. In particular, when a cyan area of maximum density is printed, the area is expressed using only large dots of the color cyan in mode 1 and using large dots and small dots of the color cyan conjointly in mode 2.

Thus, in accordance with this embodiment, when an image containing an area of high cyan density is printed, the occurrence of stripes and unevenness is prevented when high-speed printing is carried out, thereby making it possible to print at high speed without detracting from image quality. When high-quality printing is carried out, an image of improved tonality can be printed at high image quality while the occurrence of stripes and unevenness is suppressed.

In this embodiment, the number of small dots used when printing an area of high cyan density is changed depending upon the printing mode. Depending upon the ink used, however, there are instances where saturation declines even though the density is high. In a case where such ink is used, a similar effect is obtained if it is so arranged that the number of small dots used when an area of high saturation is printed is changed depending upon the printing mode. In this case, the X axis in FIGS. 9A and 9B would correspond to saturation.

Other Embodiments

In the above embodiments, the parameters of processing executed in the color conversion are given in the form of three-dimensional LUTs in accordance with the printing mode selected. However, parameters may be given in another form as a matter of course. For example, in a case where only parameters corresponding to one printing mode are stored in advance and another printing mode is selected, a method in which parameters are decided upon performing a predetermined computation is conceivable.

Furthermore, values of an output signal plotted against an input signal may be found by a method other than one using a three-dimensional LUT, e.g., by performing a predetermined computation.

The present invention may be applied to a printing system comprising a plurality of devices, as in the embodiments set forth above, or to a stand-alone printing apparatus.

For example, assume that the present invention is applied to a printing apparatus that has a slot for a PC card or memory card, etc., or that is capable of being connected to an image input device such as a digital camera, the printing apparatus being so adapted that it is capable of printing image data stored on a card that has been inserted into the slot or image data that has been output from the image input device independently without the intermediary of a host device such as a computer. In such case, the color conversion processing and quantization processing described in the foregoing embodiments would be executed within the printing apparatus.

In addition, besides a device provided as an integral part of, or separate from, an image output terminal of an information processor such as a computer, a printing apparatus according to the present invention may take on the form of a copier combined with a reader or the like, or a facsimile machine having a transceive function.

Though the foregoing embodiments are described taking, as an example, a case where multiple-pass printing is carried out for scanning a prescribed printing area (an area corresponding to one raster) a plurality of times, the present invention may be applied to a case where multiple-pass printing is not carried out.

In such case, the high-speed mode (mode 1) can be made printing by a single pass, and the high-quality mode (mode 2) can be made multiple-pass printing. More specifically, according to the present invention, it will suffice to provide at least a high-speed mode (mode 1) in which "M" (a positive integer) is a first value and a high-quality mode (mode 2) in which "M" is a value larger than the first value as printing modes for printing a prescribed printing area (an area capable of being printed in the main-scan direction by a single nozzle, namely an area corresponding to one raster) by M-number of scans.

Further, though the number of passes in the high-speed mode (mode 1) is made different from the number of passes in the high-quality mode (mode 2) in the description rendered above, the scanning speed of the head may be changed rather than the number of passes. More specifically, the scanning speed of the head would be made comparatively high in the high-speed mode (mode 1) and comparatively low in the high-quality mode (mode 2). Thus, according to the present invention, it will suffice to provide at least two modes in which the lengths of time needed to complete printing of a prescribed area differ from each other. For example, if the high-speed mode is defined as a first mode in which the printing of a prescribed area on a print medium is completed in a predetermined time, then the high-quality mode can be defined as a second mode in which the printing of the prescribed area is completed in a time longer than the predetermined time.

Each of the embodiments described above has exemplified a printer, which comprises means (e.g., an electrothermal transducer, laser beam generator, and the like) for generating heat energy as energy utilized upon execution of ink discharge, and causes a change in state of an ink by the heat energy.

Furthermore, there are cases where the object of the invention is attained also by supplying a software program (a program corresponding to the flowcharts shown in FIGS. 4 and 5 of the foregoing embodiments), which implements the functions of the foregoing embodiments, directly or remotely to a system or apparatus, reading the supplied program codes with a computer of the system or apparatus, and then executing the program codes. In this case, so long as the system or apparatus has the functions of the program, the mode of implementation need not rely upon a program.

Accordingly, since the functions of the present invention are implemented by computer, the program codes per se installed in the computer also implement the present invention. In other words, the claims of the present invention also cover a computer program that is for the purpose of implementing the functions of the present invention.

In this case, so long as the system or apparatus has the functions of the program, the form of the program, e.g., object code, a program executed by an interpreter or script data supplied to an operating system, etc., does not matter.

Examples of storage media that can be used for supplying the program are a floppy disk, hard disk, optical disk, magneto-optical disk, CD-ROM, CD-R, CD-RW, magnetic tape, non-volatile type memory card, ROM, DVD (DVD-ROM, DVD-R), etc.

As for the method of supplying the program, a client computer can be connected to a website on the Internet using a browser possessed by the client computer, and the computer program per se of the present invention or an automatically installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer also is covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to run the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiment can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

What is claimed is:

1. An ink-jet printing method for performing printing by scanning an ink-jet printhead over a print medium, the ink-jet printhead having orifices for discharging ink droplets of a first volume and orifices for discharging ink droplets of a second volume smaller than the first volume, said method comprising:

a selecting step of selecting a mode, which is to be used in printing, from a plurality of modes including a first mode in which printing in a prescribed area on the print medium is completed in a predetermined time and a second mode in which printing in the prescribed area is completed in a time longer than the predetermined time, each of the first mode and the second mode carrying out printing using the ink droplets of the first volume and the ink droplets of the second volume;

a data generating step of generating print data in accordance with the mode selected; and a printing step of carrying out printing by discharging ink toward the print medium from the ink-jet printhead based upon the print data generated, wherein a number of ink droplets of the second volume used in printing an area expressing maximum density in regard to a prescribed color in the first mode is less than a number of ink droplets of the second volume used in printing the area in the second mode.

2. The method according to claim 1, wherein a number of scannings of the ink-jet printhead for the prescribed area in the first mode is less than a number of scannings of the ink-jet printhead for the prescribed area in the second mode.

3. The method according to claim 1, wherein a scanning speed of the ink-jet printhead in the first mode is greater than a scanning speed of the ink-jet printhead in the second mode.

4. The method according to claim 1, wherein a scanning speed of the ink-jet printhead in the first mode is greater than a scanning speed of the ink-jet printhead in the second mode.

5. A ink-jet printing method for performing printing by scanning an ink-jet printhead over a print medium, the ink-jet printhead having orifices for discharging ink droplets of a first volume and orifices for discharging ink droplets of a second volume smaller than the first volume, said method comprising:

a selecting step of selecting a mode, which is to be used in printing, from a plurality of modes including a first mode in which printing in a prescribed area on the print medium is performed by scanning the ink-jet printhead a predetermined number of times and a second mode in which printing in the prescribed area is performed by scanning the ink-jet printhead a number of times greater than the predetermined number of times, each of the first mode and the second mode carrying out printing using the ink droplets of the first volume and the ink droplets of the second volume;

a data processing step of executing data processing that conforms to the mode selected; and a printing step of carrying out printing by discharging ink toward the print medium from the ink-jet printhead based upon data that has undergone the data processing, wherein said data processing step is such that (A) in a case where the first mode has been selected, data processing is executed in such a manner that an area expressing maximum density with regard to a prescribed color will be printed using the ink droplets of the first volume rather than the ink droplets of the second volume, and (B) in a case where the second mode has been selected, data processing is executed in such a manner that the area expressing maximum density will be printed using both the ink droplets of the first volume and the ink droplets of the second volume.

6. A printing system comprising an ink-jet printing apparatus and a host device for transmitting print data to said printing apparatus, wherein said printing apparatus performs printing by scanning an ink-jet printhead over a print medium, the printhead having orifices for discharging ink droplets of a first volume and orifices for discharging ink droplets of a second volume smaller than the first volume, and said printing apparatus is capable of printing in a plurality of modes including a first mode in which printing in a prescribed area on the print medium is completed in a predetermined time, and a second mode in which printing in the prescribed area is completed in a time longer than the predetermined time, each of the first mode and the second mode carrying out printing using the ink droplets of the first volume and the ink droplets of the second volume, said host device including:

mode selecting means for allowing a user to select a mode, which is to be used in printing, from the plurality of modes; and data processing means for executing data processing and generating print data in accordance with the mode selected by said mode selecting means, said data processing means executing data processing in such a manner that a number of ink droplets of the second volume used in printing an area expressing maximum density in regard to a prescribed color in the first mode is less than a number of ink droplets of the second volume used in printing the area in the second mode.

7. The system according to claim 6, wherein in the first mode, the area expressing maximum density with regard to the prescribed color is printed using ink droplets of the first volume without using ink droplets of the second volume.

8. A printing system comprising an ink-jet printing apparatus and a host device for transmitting print data to said printing apparatus, wherein said printing apparatus performs printing by scanning an ink-jet printhead over a print medium, the printhead having orifices for discharging ink droplets of a first volume and orifices for discharging ink droplets of a second volume smaller than the first volume, and said printing apparatus is capable of printing in a plurality of modes including a first mode in which printing in a prescribed area on the print medium is performed by scanning the ink-jet printhead a predetermined number of times and a second mode in which printing in the prescribed area is performed by scanning the ink-jet printhead a number of times greater than the predetermined number of times, each of the first mode and the second mode carrying out printing using the ink droplets of the first volume and the ink droplets of the second volume, said host device including:

mode selecting means for allowing a user to select a mode, which is to be used in printing, from the plurality of modes;

image processing means for executing data processing that conforms to the mode selected by said mode selecting means; and means for transmitting data that has undergone the data processing to said printing apparatus; and said printing apparatus including:

printing control means for carrying out printing by discharge ink toward the print medium from the ink-jet printhead based upon the data transmitted, wherein said image processing means of said host device executes data processing in such a manner that (A) in a case where the first mode has been selected, an area expressing maximum density with regard to a prescribed color will be printed using the ink droplets of the first volume rather than the ink droplets of the second volume, and (B) in a case where the second mode has been selected, the area expressing maximum density will be printed using both the ink droplets of the first volume and the ink droplets of the second volume.

9. An ink-jet printing apparatus for performing printing by scanning an ink-jet printhead over a print medium, the printhead having orifices for discharging ink droplets of a first volume and orifices for discharging ink droplets of a second volume smaller than the first volume, and said apparatus being capable of printing in a plurality of modes including a first mode in which printing in a prescribed area on the print medium is completed in a predetermined time, and a second mode in which printing in the prescribed area is completed in a time longer than the predetermined time, each of the first mode and the second mode carrying out printing using the ink droplets of the first volume and the ink droplets of the second volume, said apparatus comprising:

mode discriminating means for discriminating which of the plurality of modes has been set;

converting means for converting entered image data to print data in accordance with the mode discriminated by said mode discriminating means; and printing control means for carrying out printing by discharging ink toward the print medium from the ink-jet printhead based upon the print data, said converting means performing a data conversion in such a manner that a number of ink droplets of the second volume used in printing an area expressing maximum density in regard to a prescribed color in the first mode is less than a number of ink droplets of the second volume used in printing the area in the second mode.

10. The apparatus according to claim 9, wherein in the first mode, the area expressing maximum density with regard to the prescribed color is printed using ink droplets of the first volume without using ink droplets of the second volume.

11. An ink-jet printing apparatus for performing printing by scanning an ink-jet printhead over a print medium, the printhead having orifices for discharging ink droplets of a first volume and orifices for discharging ink droplets of a second volume smaller than the first volume, and said printing apparatus being capable of printing in a plurality of modes including a first mode in which printing in a prescribed area on the print medium is performed by scanning the ink-jet printhead a predetermined number of times and a second mode in which printing in the prescribed area is performed by scanning the ink-jet printhead a number of times greater than the predetermined number of times, each of the first mode and the second mode carrying out printing using the ink droplets of the first volume and the ink droplets of the second volume, said apparatus comprising:

mode discriminating means for discriminating which of the plurality of modes has been set;

image processing means for executing data processing that conforms to the mode discriminated by said mode discriminating means; and printing control means for carrying out printing by discharging ink toward the print medium from the ink-jet printhead based upon data that has undergone the data processing, wherein said image processing means executes data processing in such a manner that (A) in a case where the first mode has been selected, an area expressing maximum density with regard to a prescribed color will be printed using the ink droplets of the first volume rather than the ink droplets of the second volume, and (B) in a case where the second mode has been selected, the area expressing maximum density will be printed using both the ink droplets of the first volume and the ink droplets of the second volume.

12. A method of generating print data for use by an ink-jet printing apparatus that performs printing by scanning an ink-jet printhead over a print medium, the printhead having orifices for discharging ink droplets of a first volume and orifices for discharging ink droplets of a second volume smaller than the first volume, said method comprising:

a selecting step of selecting a mode, which is to be used in printing, from a plurality of modes including a first mode in which printing in a prescribed area on the print medium is completed in a predetermined time, and a second mode in which printing in the prescribed area is completed in a time longer than the predetermined time, each of the first mode and the second mode carrying out printing using the ink droplets of the first volume and the ink droplets of the second volume; and a data generating step of generating print data in accordance with the mode selected, wherein a number of ink droplets of the second volume used in printing an area expressing maximum density in regard to a prescribed color in the first mode is less than a number of ink droplets of the second volume used in printing the area in the second mode.

13. The method according to claim 8, wherein in the first mode, the area expressing maximum density with regard to the prescribed color is printed using using ink droplets of the first volume without using ink droplets of the second volume.

14. A method of generating print data for use by an ink-jet printing apparatus that performs printing by scanning an ink-jet printhead over a print medium, the printhead having orifices for discharging ink droplets of a first volume and orifices for discharging ink droplets of a second volume smaller than the first volume, said method comprising:

a selecting step of selecting a mode, which is to be used in printing, from a plurality of modes including a first mode in which printing in a prescribed area on the print medium is performed by scanning the ink-jet printhead a predetermined number of times and a second mode in which printing in the prescribed area is performed by scanning the ink-jet printhead a number of times greater than the predetermined number of times, each of the first mode and the second mode carrying out printing using the ink droplets of the first volume and the ink droplets of the second volume; and a data generating step of executing image processing that conforms to the mode selected and generating print data, wherein said data generating step is such that (A) in a case where the first mode has been selected, data processing is executed in such a manner that an area expressing maximum density with regard to a prescribed color will be printed using the ink droplets of the first volume rather than the ink droplets of the second volume, and (B) in a case where the second mode has been selected, data processing is executed in such a manner that the area expressing maximum density will be printed using both the ink droplets of the first volume and the ink droplets of the second volume.

15. A program for generating print data to be transmitted to an ink-jet printing apparatus that performs printing by scanning an ink-jet printhead over a print medium, the printhead having orifices for discharging ink droplets of a first volume and orifices for discharging ink droplets of a second volume smaller than the first volume, said program causing a computer to execute:

a selecting step of selecting a mode, which is to be used in printing, from a plurality of modes including a first mode in which printing in a prescribed area on the print medium is performed by scanning the ink-jet printhead a predetermined number of times and a second mode in which printing in the prescribed area is performed by scanning the ink-jet printhead a number of times greater than the predetermined number of times, each of the first mode and the second mode carrying out printing using the ink droplets of the first volume and the ink droplets of the second volume; and a data processing step of executing data processing in such a manner that (A) in a case where the mode selected is the first mode, an area expressing maximum density with regard to a prescribed color will be printed using the ink droplets of the first volume rather than the ink droplets of the second volume, and (B) in a case where the selected mode is the second mode, the area expressing maximum density will be printed using both the ink droplets of the first volume and the ink droplets of the second volume; and a step of transmitting data, which has been processed at said data processing step, to the ink-jet printing apparatus as print data.

16. An ink-jet printing method for performing printing by scanning an ink-jet printhead over a print medium, the ink-jet printhead having orifices for discharging ink droplets of a first volume and orifices for discharging ink droplets of a second volume smaller than the first volume, said method comprising:

a selecting step of selecting a mode, which is to be used in printing, from a plurality of modes including a first mode in which printing in a prescribed area on the print medium is completed in a predetermined time and a second mode in which printing in the prescribed area is completed in a time longer than the predetermined time, each of the first mode and the second mode carrying out printing using the ink droplets of the first volume and the ink droplets of the second volume;

a data generating step of generating print data in accordance with the mode selected; and a printing step of carrying out printing by discharging ink toward the print medium from the ink-jet printhead based upon the print data generated, wherein a number of ink droplets of the second volume used in printing an area expressing maximum saturation in regard to a prescribed color in the first mode is less than a number of ink droplets of the second volume used in printing the area expressing maximum saturation in the second mode.

17. An ink-jet printing method for performing printing by scanning an ink-jet printhead over a print medium, said ink-jet printhead having orifices for discharging ink droplets of a first volume and orifices for discharging ink droplets of a second volume smaller than the first volume, said method comprising:

a selecting step of selecting a mode, which is to be used in printing, from a plurality of modes including a first mode in which printing in a prescribed area on the print medium is performed by scanning the ink-jet printhead a predetermined number of times and a second mode in which printing in the prescribed area is performed by scanning the ink-jet printhead a number of times greater than the predetermined number of times, each of the first mode and the second mode carrying out printing using the ink droplets of the first volume and the ink droplets of the second volume;

an image processing step of executing data processing that conforms to the mode selected; and a printing step of carrying out printing by discharging ink toward the print medium from the ink-jet printhead based upon data that has undergone the data processing, wherein said data processing step is such that (A) in a case where the first mode has been selected, data processing is executed in such a manner that an area expressing maximum saturation with regard to a prescribed color will be printed using the ink droplets of the first volume rather than the ink droplets of the second volume, and (B) in a case where the second mode has been selected, data processing is executed in such a manner that the area expressing maximum saturation will be printed using both the ink droplets of the first volume and the ink droplets of the second volume.

* * * * *

UNITED STATES PATENT AND TRADEMARK OFFICE
CERTIFICATE OF CORRECTION

PATENT NO. : 7,097,267 B2
APPLICATION NO. : 10/653207
DATED : August 29, 2006
INVENTOR(S) : Kato et al.

It is certified that error appears in the above-identified patent and that said Letters Patent is hereby corrected as shown below:

COLUMN 14:
Lines 65-67, claim 4 should read --The method according to claim 1, wherein in the first mode, the area expressing maximum density with regard to the prescribed color is printed using ink droplets of the first volume without using ink droplets of the second volume.--.

COLUMN 17:
Line 59, "claim 8," should read --claim 12,--.
Line 61, "using" (second occurrence) should be deleted.

Signed and Sealed this

Fourth Day of November, 2008

JON W. DUDAS
*Director of the United States Patent and Trademark Office*